United States Patent
Suzuki et al.

(10) Patent No.: US 8,367,241 B2
(45) Date of Patent: Feb. 5, 2013

(54) SEPARATOR FOR FUEL CELL AND MANUFACTURING METHOD THEREFOR

(75) Inventors: Jun Suzuki, Kobe (JP); Nobuhiro Kobayashi, Kobe (JP); Yoshinori Ito, Kobe (JP); Toshiki Sato, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 523 days.

(21) Appl. No.: 12/647,754

(22) Filed: Dec. 28, 2009

(65) Prior Publication Data

US 2010/0209786 A1    Aug. 19, 2010

(30) Foreign Application Priority Data

Feb. 19, 2009 (JP) .................. 2009-036658
Aug. 26, 2009 (JP) .................. 2009-195868
Nov. 27, 2009 (JP) .................. 2009-270475

(51) Int. Cl.
    *H01M 2/16*    (2006.01)
(52) U.S. Cl. ................................... 429/144
(58) Field of Classification Search ............ 429/144
    See application file for complete search history.

(56) References Cited

FOREIGN PATENT DOCUMENTS

| DE | 100 17 058 A1 | 10/2001 |
|----|---------------|---------|
| DE | 601 27 337 T2 | 11/2007 |
| JP | 2000-58080    | 2/2000  |
| JP | 2000-164228   | 6/2000  |
| JP | 2005-243595   | 9/2005  |
| JP | 2006-49209    | 2/2006  |
| JP | 2009-32671    | 2/2009  |

OTHER PUBLICATIONS

Office Action issued Aug. 11, 2011 in Korean Patent application No. 10-2010-14436 (with English translation).
Office Action issued Aug. 23, 2010, in Patent Application No. 10 2010 007 624.4-45 (with English translation).
U.S. Appl. No. 12/615,377, filed Nov. 10, 2009, Ito, et al.
U.S. Appl. No. 12/709,935, filed Feb. 22, 2010, Sato et al.

*Primary Examiner* — Stuart Hendrickson
(74) *Attorney, Agent, or Firm* — Oblon, Spivak, McClelland, Maier & Neustadt, L.L.P.

(57) ABSTRACT

Disclosed are a separator for a fuel cell realizing both the high electrical conductivity and the corrosion resistance and enabling using stably for a long period of time in the fuel cell and a manufacturing method for it. The separator for a fuel cell 1 includes a substrate 2 composed of pure aluminum or aluminum alloy and a plating layer 3 formed on the substrate 2, wherein the plating layer 3 has a copper layer 3a formed in the substrate 2 side and a tin layer 3b formed on the copper layer 3a, the tin layer 3b is formed in an uppermost layer, the thickness of the copper layer 3a is 0.10 μm or above, and the value obtained by dividing the thickness of the tin layer 3b by the thickness of the copper layer 3a is 0.1-50.

10 Claims, 5 Drawing Sheets

SEPARATOR FOR FUEL CELL AND MANUFACTURING METHOD THEREFOR

TECHNICAL FIELD

The present invention relates to a separator for a fuel cell used for a fuel cell, particularly a polymer electrolyte fuel cell, and a manufacturing method thereof.

BACKGROUND ART

Figure 2:
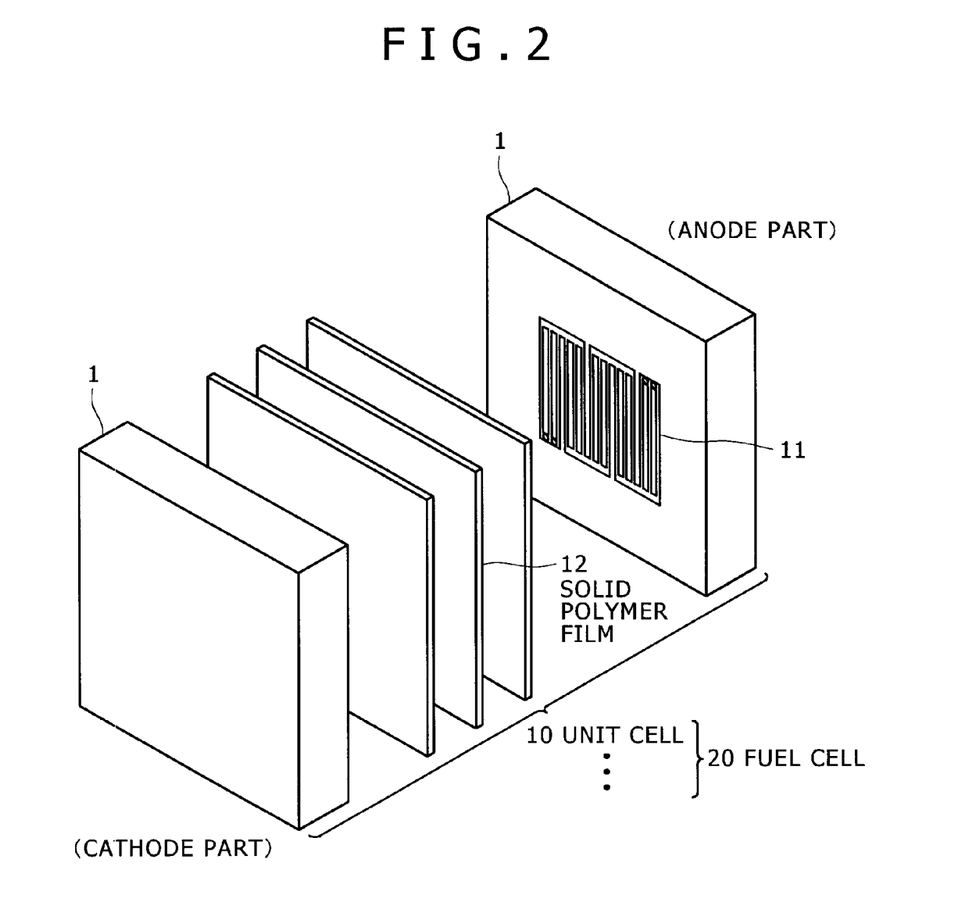
[FIG. 2] A perspective view showing the appearance when a part of a fuel cell is spread.

As shown in FIG. 2, the polymer electrolyte fuel cell (fuel cell) 20 is constructed by stacking a plurality of unit cells 10 with electrodes called separators (or bipolar plates) 1 in between, with a solid polymer electrolyte film (solid polymer film) 12 embraced by an anode electrode (anode part) and a cathode electrode (cathode part) as a unit cell 10.

For the material of the separator for a fuel cell, the characteristic that the contact resistance is low which is to be maintained for a long period of time during use as a separator is required. As the materials with such characteristics, conventionally, application of metallic materials such as an aluminum alloy, stainless steel, nickel alloy, titanium alloy have been studied in consideration of the aspects of workability and strength as well.

On the other hand, for a separator for a fuel cell for an automobile (hereinafter referred to as a "separator"), for example, downsizing, weight reduction, and cost reduction have been strongly required. In this regard, aluminum is expected as one of the promising materials because it is light in weight, with excellent workability, and of low cost compared with stainless steel and titanium alloy.

Further, because the environment inside the fuel cell where the separator is placed is of high temperature and acid atmosphere, when the separator is constructed of a pure aluminum substrate, the surface of the aluminum substrate is corroded in a short period of time, the aluminum ions are eluted from the substrate, the electric resistance increases by a corrosion product generated on the surface of the substrate, and the function as a separator is not exerted.

With reference to such problems, Patent Document 1 describes a separator wherein any of a carbon layer, silicon carbide layer, nickel layer, chromium layer, tin layer is formed on the surface of the aluminum substrate with the aim of allowing the aluminum substrate to have both the corrosion resistance and the electrical conductivity. Also, Patent Document 2 and Patent Document 3 describe a separator wherein a porous anodic oxide film is formed first on the aluminum substrate attaching importance to the corrosion resistance, and an electrically conductive film (dielectric breakdown region) is formed on its surface or in a hole. Patent Document 4 describes a separator including an aluminum substrate and a resin layer containing an electrically conductive material formed to cover the aluminum substrate through a first intermediate layer having a nickel plating layer or a copper plating layer and a second intermediate layer having a tin plating layer or a tin alloy plating layer.

Prior Art Literature
Patent Document
[Patent Document 1] Japanese Unexamined Patent Application Publication No. 2000-58080
[Patent Document 2] Japanese Unexamined Patent Application Publication No. 2006-49209
[Patent Document 3] Japanese Unexamined Patent Application Publication No. 2005-243595
[Patent Document 4] Japanese Unexamined Patent Application Publication No. 2009-32671

DISCLOSURE OF INVENTION

However, in Patent Document 1, realization of both the corrosion resistance and the electrical conductivity at the same time by a single layer only is aimed, but a pinhole is hard to be eliminated by a single layer, and corrosion may progress from a starting point of the pinhole. In Patent Document 2 and Patent Document 3, because the anodic oxide film was of an insulating property, even if an electrically conductive film (dielectric breakdown region) was formed on its surface, the electric resistance could not be lowered enough. In Patent document 4, because the resin was of an insulating property, even if an electrically conductive material was contained, the electric resistance could not be lowered enough.

Under such circumstances, the present invention was devised in order to solve such problems, and its object is to provide a separator for a fuel cell realizing both the high electrical conductivity and the corrosion resistance and enabling using stably for a long period of time in the fuel cell and a manufacturing method therefor.

Means to solve the Problems

In order to solve the problems described above, a separator for a fuel cell in relation with the present invention is a separator for a fuel cell including a substrate composed of pure aluminum or aluminum alloy and a plating layer formed on the substrate, in which the plating layer has a copper layer formed in the substrate side and a tin layer formed on the copper layer, the tin layer is formed in an uppermost layer, the thickness of the copper layer is 0.10 μm or above, and the value obtained by dividing the thickness of the tin layer by the thickness of the copper layer is 0.1-50.

According to the construction, because the tin layer is provided, the contact resistance of the separator is maintained low for a long period of time. Also, a pinhole of the copper layer and the tin layer is inhibited by provision of the copper layer and the tin layer with a designate thickness, and the adhesiveness of the substrate and the copper layer as well as that of the copper layer and the tin layer is improved and exfoliation of the copper layer and the tin layer is inhibited because the copper layer is provided. Consequently, exposure of the substrate to a high temperature and acid atmosphere can be prevented, elution of the aluminum ions from the substrate becomes less, and generation of a corrosion products formed on the surface of the substrate becomes less. Also, a diffusion layer where the copper is diffused into the tin layer is formed in the boundary face of the copper layer and the tin layer, the diffusion layer grows in the actuation temperature of the fuel cell (separator), and voids formed in the boundary face of the copper layer and the tin layer are filled, therefore the adhesiveness of the copper layer and the tin layer is improved.

The separator for a fuel cell in relation with the present invention further includes an underlayer between the substrate and the plating Layer, and the underlayer preferably is composed of a metal selected from nickel, chromium, iron, cobalt or an alloy thereof. Further, it is preferable that the thickness of the underlayer is 0.5 μm or above.

According to the construction, the adhesiveness of the substrate and the copper layer is further improved because these underlayers are provided.

In the separator for a fuel cell in relation with the present invention, the tin layer may be a tin single layer composed of tin only, and the tin single layer may be formed in an uppermost layer.

According to the construction, a tin layer having the electrical conductivity can easily be manufactured because the tin layer is the tin single layer.

The separator for a fuel cell in relation with the present invention is a separator in which the tin layer is a tin and carbon mixture layer composed of tin and carbon and the tin and carbon mixture layer is formed in an uppermost layer, or a separator in which the tin layer includes a tin single layer composed of tin only and a tin and carbon mixture layer composed of tin and carbon formed on the tin single layer, the tin and carbon mixture layer is formed in an uppermost layer, and a ratio of atom % of tin and carbon (Sn(at %)/C(at %)) is preferably 0.01-2 when a composition analysis is performed from the uppermost layer side by a scanning electron microscope/an energy dispersion type analyzer (SEM/EDX) under a condition of 15 kV acceleration voltage.

According to the construction, because the tin and carbon mixture layer is formed in the uppermost layer and Sn(at %)/C(at %) is within a designated range, the carbon in the tin and carbon mixture layer acts as an electrically conductive path conducting the surface of the separator and the inside of the tin layer, and increase of the contact resistance of the surface of the separator is inhibited further than in the case that the uppermost layer is the tin single layer and the low contact resistance is maintained long during operation as a fuel cell.

The manufacturing method of a separator for a fuel cell in relation with the present invention includes a substrate manufacturing step for manufacturing a substrate and a plating layer forming step for forming the plating layer on the substrate, in which the plating layer is formed by a wet plating method in the plating layer forming step.

According to the procedure, because a plating layer is formed by a wet plating method, a uniform plating layer is formed on a substrate to its shape, and exposure of the substrate to high temperature and acid atmosphere can be prevented.

Other manufacturing method of a separator for a fuel cell in relation with the present invention includes a substrate manufacturing step for manufacturing a substrate, an underlayer forming step for forming the underlayer on the substrate, and a plating layer forming step for forming the plating layer on the underlayer, in which the underlayer and the plating layer are formed by a wet plating method in the underlayer forming step and the plating layer forming step.

According to the procedure, because an underlayer and a plating layer are formed by a wet plating method, uniform underlayer and plating layer are formed on a substrate to its shape, and exposure of the substrate to high temperature and acid atmosphere can be prevented.

The manufacturing method of a separator for a fuel cell in relation with the present invention is characterized in that the tin layer of the plating layer formed in the plating layer forming step is a tin single layer composed of tin only.

According to the procedure, a tin layer having the electrical conductivity can be manufactured easily because the tin layer is the tin single layer.

Other manufacturing method of a separator for a fuel cell in relation with the present invention is a manufacturing method of a separator in which the tin layer of the plating layer formed in the plating layer forming step is a tin and carbon mixture layer composed of tin and carbon or a manufacturing method of a separator in which the tin layer of the plating layer formed in the plating layer forming step includes a tin single layer composed of tin and a tin and carbon mixture layer composed of tin and carbon formed on the tin single layer, and the tin and carbon mixture layer is formed by a plating treatment by adding carbon and a cationic surfactant into a tin plating bath and adjusting the carbon content in the tin plating bath to 1-200 g/l.

According to the procedure, in a manufacturing method of a separator in which a tin and carbon mixture layer is formed, the tin and carbon mixture layer is formed by a plating treatment of adding carbon and a cationic surfactant into the tin plating bath and adjusting the carbon content in the tin plating bath to a designated range, therefore Sn(at %)/C(at %) of the tin and carbon mixture layer can be controlled to a designated range. Thus, the carbon in the tin and carbon mixture layer acts as an electrically conductive path conducting the surface of the separator and the inside of the tin layer, and increase of the contact resistance of the surface of the separator is inhibited further than in the case that the uppermost layer is the tin single layer and the low contact resistance is maintained long during operation as a fuel cell.

Effects of the Invention

A separator for a fuel cell in relation with the present invention is excellent in the electrical conductivity and the corrosion resistance, and can be used stably within a fuel cell for a long period of time. Also, according to a manufacturing method of a separator for a fuel cell in relation with the present invention, a separator for a fuel cell excellent in the electrical conductivity and the corrosion resistance can be manufactured.

BRIEF DESCRIPTION OF THE DRAWINGS

[FIGS. 1] (a), (b) are cross-sectional drawings showing the construction of a separator for a fuel cell in relation with the present invention.

[FIGS. 5] (a), (b) are flowcharts explaining the steps of the manufacturing method of a separator for a fuel cell in relation with the present invention.

BEST MODE FOR CARRYING OUT THE INVENTION

First, an embodiment of a separator for a fuel cell in relation with the present invention will be described in detail.

{Separator for a Fuel Cell}

Figure 1:
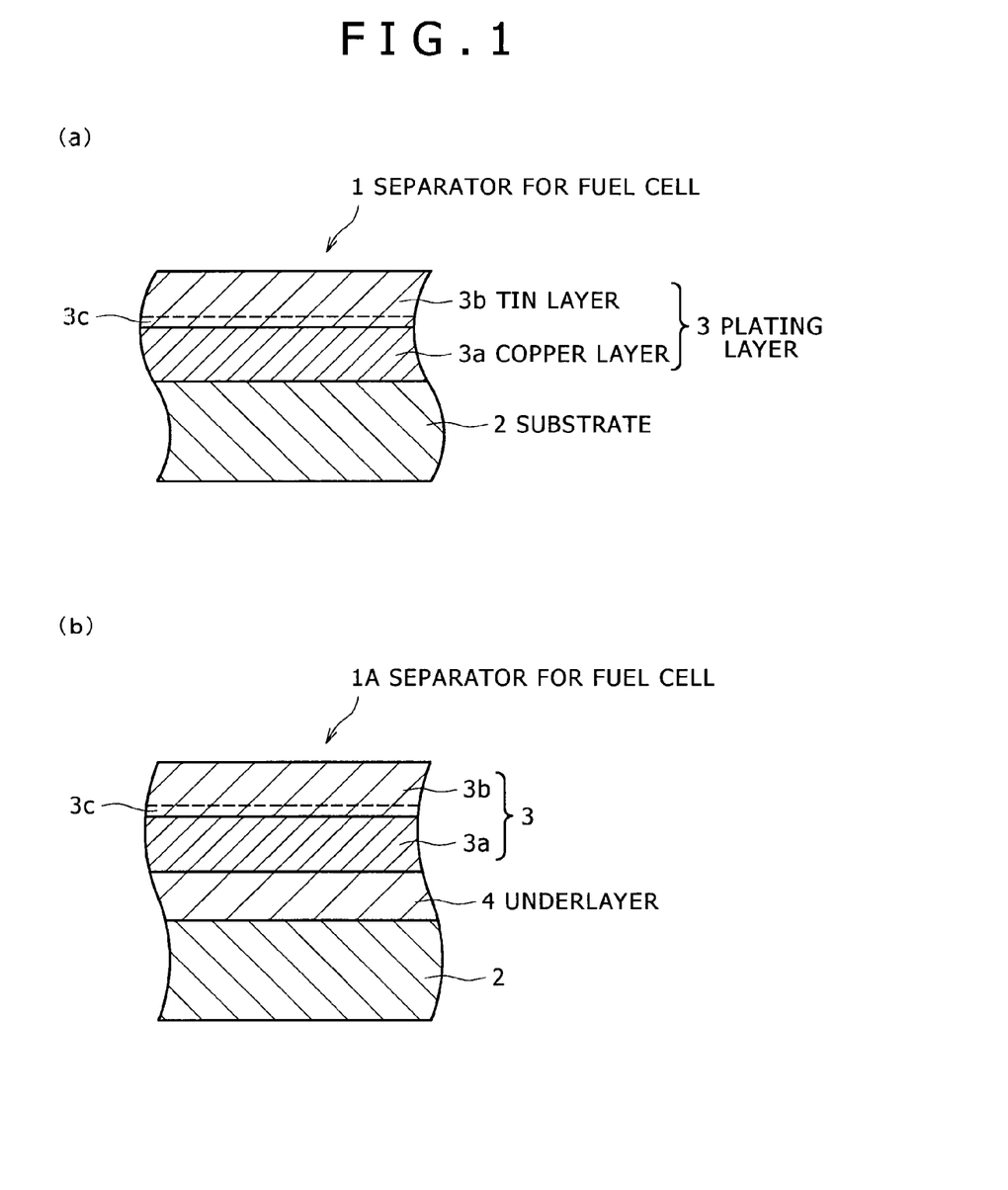

As shown in FIG. 1 (a), a separator for a fuel cell (hereinafter referred to as "separator" according to the necessity) 1 includes a substrate 2 and a plating layer 3 formed on the substrate 2. Also, the plating layer 3 comprises a copper layer 3a and a tin layer 3b. Each construction will be described below.

(Substrate)

The substrate 2 is of pure aluminum or aluminum alloy (1000 series, 2000 series, 3000 series, 4000 series, 5000 series, 6000 series, 7000 series, 8000 series), and from the point of corrosion resistance and workability, 1000 series alloy (pure aluminum for industrial use), 3000 series alloy (Al—Mn-based alloy), 5000 series alloy (Al—Mg-based alloy), 6000 series alloy (Al—Mg—Si-based alloy), or 8000 series alloy (Al—Fe—Si-based alloy or Al—Li-based alloy) stipulated in JIS are preferable.

Although the thickness of the substrate 2 is not particularly limited, 0.05-0.5 mm is preferable. If the thickness is made within this range, the strength and the handling characteristic as a sheet material can be provided while machining to such thickness is comparatively easy. It is a matter of course to set the thickness to below 0.05 mm or to over 0.5 mm may be set according to the necessity.

The substrate 2 may form a recessed part 11 on its surface for flowing gas such as hydrogen and air in actuation of a fuel cell 20 (refer to FIG. 2). The pattern of the recessed part 11 is not limited to the pattern shown in FIG. 2, and may be changed appropriately according to the necessity.

(Plating Layer)

The plating layer 3 comprises the copper layer 3a formed in the substrate 2 side and the tin layer 3b formed on the copper layer 3a, the tin layer 3b is formed in the uppermost layer, the thickness of the copper layer 3a is 0.10 µM or above, and the value obtained by dividing the thickness of the tin layer 3b by the thickness of the copper layer 3a is 0.1-50. Here, the uppermost layer means the layer formed in the side of the surface which is exposed to the high temperature and acid atmosphere in the separator 1.

The copper layer 3a has an action of improving the corrosion resistance of the separator 1 by improving the adhesiveness of the plating layer 3. For example, even if the tin layer 3b is to be formed directly on the aluminum substrate (substrate 2), local film (tin layer 3b) exfoliation occurs because the adhesiveness is inferior. On the other hand, when the copper layer 3a is formed first on the substrate 2 and the tin layer 3b is formed thereon, both the adhesiveness of the substrate 2 and the copper layer 3a and the adhesiveness of the copper layer 3a and the tin layer 3b are excellent and exfoliation of the film (the copper layer 3a and the tin layer 3b) does not occur. As a result, exposure of the substrate 2 which causes the corrosion and elution of the aluminum ions from the substrate 2 can be prevented. Because of such reasons, the copper layer 3a is disposed in the substrate 2 side of the plating layer 3.

When the thickness of the copper layer 3a is below 0.10 µm, pinholes are generated much in forming the copper layer 3a. When there are pinholes in the copper layer 3a, if the tin layer 3b is formed thick on them, the pinholes seem to have been reduced; however, because the adhesiveness of the tin layer 3b and the substrate 2 is insufficient in the part, the part easily exfoliates, the substrate 2 is exposed, and the corrosion occurs. Therefore, the thickness of the copper layer 3a is 0.10 µm or above. On the other hand, although the upper limit of the thickness of the copper layer 3a is not determined by performance, 50 µm is preferable from the viewpoint of the productivity.

The tin layer 3b is formed in the uppermost layer of the separator 1 and has an action of improving the electrical conductivity and the corrosion resistance. Tin exerts excellent corrosion resistance in the high temperature and acid atmosphere (pH 2-4) to which the separator 1 is exposed because tin exists as a tin oxide in the atmosphere. Also, as is proved by the use of a tin oxide film for a transparent electrically conductive film, the tin oxide has the electrical conductivity. For such reasons, the tin layer 3b is disposed in the uppermost layer of the plating layer 3 (on the copper layer 3a). Further, the tin layer 3b may be any of one layer of the tin single layer composed of tin only, one layer of the tin and carbon mixture layer composed of tin and carbon, and two layers of the tin single layer and the tin and carbon mixture layer formed thereon.

With respect to the tin layer 3b, when the value obtained by dividing the thickness of the tin layer 3b by the thickness of the copper layer 3a is below 0.1, the thickness of the tin layer 3b becomes too thin and a pinhole area appears in the tin layer 3b. When the pinhole area appears in the tin layer 3b, copper (the copper layer 3a) is exposed there. Because copper is a noble metal with relative to tin in the high temperature and acid atmosphere (pH 2-4), when it is exposed in the pinhole area, the copper becomes a cathode site, and oxidation of the tin layer 3b is promoted, or elution of tin occurs. Thereby, the electrical conductivity of the separator 1 deteriorates. On the other hand, when the value obtained by dividing the thickness of the tin layer 3b by the thickness of the copper layer 3a exceeds 50, no particular problem arises on durability; however, it takes long hours to form thick and the productivity deteriorates. Accordingly, the value obtained by dividing the thickness of the tin layer 3b by the thickness of the copper layer 3a is 0.1-50, preferably 0.2 or above, and more preferably 0.3 or above.

In the boundary face of the copper layer 3a and the tin layer 3b in the plating layer 3, a diffusion layer 3c where copper is diffused into the tin layer 3b is formed. When the cross-section of the plating layer is observed, this diffusion layer 3c is formed in the continuous islands shape (refer to FIG. 4). Also, formation of the diffusion layer 3c acts highly effectively for the adhesiveness of the copper layer and the tin layer.

In the 60-90° C. range which is the actuation temperature for the fuel cell 20 (the separator 1, refer to FIG. 2), the diffusion layer 3c where copper and tin coexist grows, therefore the adhesiveness of the copper layer 3a and the tin layer 3b improves as the actuation time elapses. Also, even when a small gap is present between the boundary face of two layers of the copper layer 3a and the tin layer 3b, the gap is filled by growth of this diffusion layer 3c, in other words, the diffusion layer 3c exerts a self-remedial action. As a result, the plating layer 3 of the separator 1 can be maintained stably for a long period of time.

In addition to the construction described above (the substrate 2, plating layer 3 (copper layer 3a, tin layer 3b)), the separator 1A may be one further provided with an underlayer 4 between the substrate 2 and the plating layer 3 as shown in FIG. 1 (b). Because the substrate 2 and the plating layer 3 were described above, explanation will be omitted, and the underlayer 4 will be described.

(Underlayer)

To start with, excellent adhesiveness can be obtained even by forming the copper layer 3a directly on the substrate 2 as done in the separator 1 exhibited in FIG. 1 (a). However, in order to further improve the adhesiveness of the substrate 2 and the copper layer 3a, it is advisable to provide the underlayer 4 composed of a metal selected from nickel, chromium, iron, cobalt, or an alloy thereof (for example, Ni—P, Ni—B, and the like) between the copper layer 3a and the substrate 2. Also, the thickness of the underlayer 4 is preferably 0.5 µm or above. Further, the upper limit of the thickness of the underlayer 4 is not particularly limited, however 20 µm or below is preferable from the point of the productivity.

In the separators 1, 1A described above (refer to FIG. 1 (a), (b)), in order to inhibit increase of the contact resistance of the separator surface under the environment inside the fuel cell, the tin layer 3b is preferably the one containing carbon at least in its surface, more specifically the one containing the particles and fine fibers of carbon (graphite, for example).

As described above, in the tin layer 3b, a tin oxide layer is formed in its surface in the high temperature and acid atmosphere such as the inside of the fuel cell; however, extreme increase of the contact resistance does not occur because this tin oxide has the electrical conductivity. However, the contact resistance value itself becomes large in comparison with metallic tin. In order to inhibit increase of the contact resistance of the surface of the tin layer 3b even under the high temperature and acid atmosphere, it is preferable that at least the surface of the tin layer 3b contains the particles and fine fibers of carbon so as to conduct the surface of the separator 1, 1A and the inside of the tin layer 3b and to construct so that this carbon part becomes an electrically conductive path. Consequently, with respect to the tin layer 3b, one layer of the tin and carbon mixture layer and two layers of the tin single layer and the tin and carbon mixture layer formed thereon are preferable.

In such a construction, when a composition analysis is performed from the uppermost layer side of the separator 1, 1A by a scanning electron microscope/an energy dispersion type analyzer (SEM/EDX) under a condition of 15 kV acceleration voltage, the ratio of atom % of tin and carbon (Sn(at %)/C(at %)) is preferably in the range of 0.01-2. When the ratio of atom % of tin and carbon (Sn(at %)/C(at %)) is below 0.01, the uppermost surface is covered generally only by the particles and fine fibers of carbon; however, the particles and fine fibers of carbon do not adhere with themselves; therefore, they become a weak layer such that it exfoliates easily when touched by a finger. In such a state that tin links the particles and fine fibers of carbon with each other, the strength can be maintained as a layer.

On the other hand, when the ratio of atom % of tin and carbon (Sn(at %)/C(at %)) exceeds 2, the quantity of the carbon acting as an electrically conductive path decreases, and the effect of inhibiting increase of the contact resistance of the surface of the separator 1, 1A in the high temperature and acid atmosphere cannot be obtained. The preferable range of the ratio of atom % of tin and carbon (Sn(at %)/C(at %)) is 0.05-1.8, more preferably 0.1-1.5.

Although the case in which the particles and fine fibers of carbon are used with the aim of inhibiting increase of the contact resistance is conventionally known, the particles and fine fibers of carbon are mixed with a resin (refer to Japanese Unexamined Patent Application Publication No. 2009-32671, for example). By selecting the resin considering the resistance and the water absorbing property against the temperature and acid and mixing the particles and fine fibers of carbon by an appropriate quantity, even the resin can exhibit the electrical conductivity, and inhibition of increase of the contact resistance value becomes possible even in the high temperature and acid atmosphere inside the fuel cell. However, the initial contact resistance value of a separator including a resin layer having the particles and the like of carbon tends to become a value larger than the contact resistance value of the present invention because the resin is of an insulating property.

Figure 3:
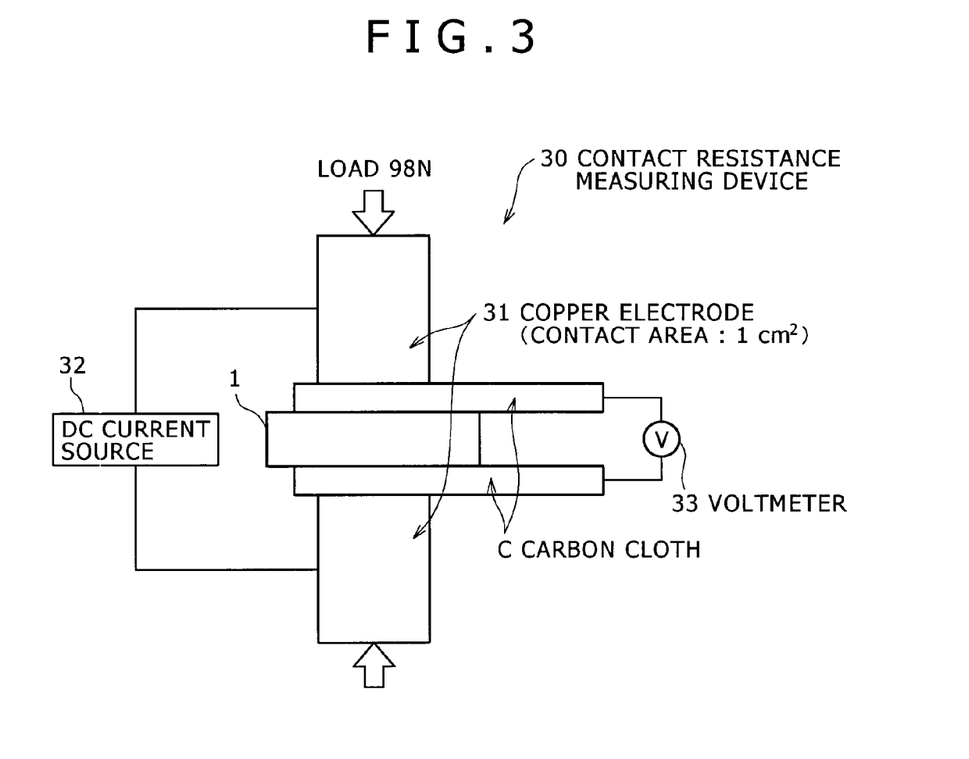
[FIG. 3] An explanatory drawing explaining a measuring method of the contact resistance value.

For example, it has been confirmed that, when the contact resistance value is measured by a method shown in FIG. 3 which will be described later, the initial contact resistance value of the separator 1, 1A of the present invention is 1-2 $m\Omega \cdot cm^2$, whereas the initial contact resistance value of a separator comprising a resin layer including the particles and the like of carbon is a value exceeding 5 $m\Omega \cdot cm^2$.

Next, the manufacturing method of a separator for a fuel cell in relation with the present invention will be described in detail.

{Manufacturing Method of Separator for Fuel Cell}

Figure 5:
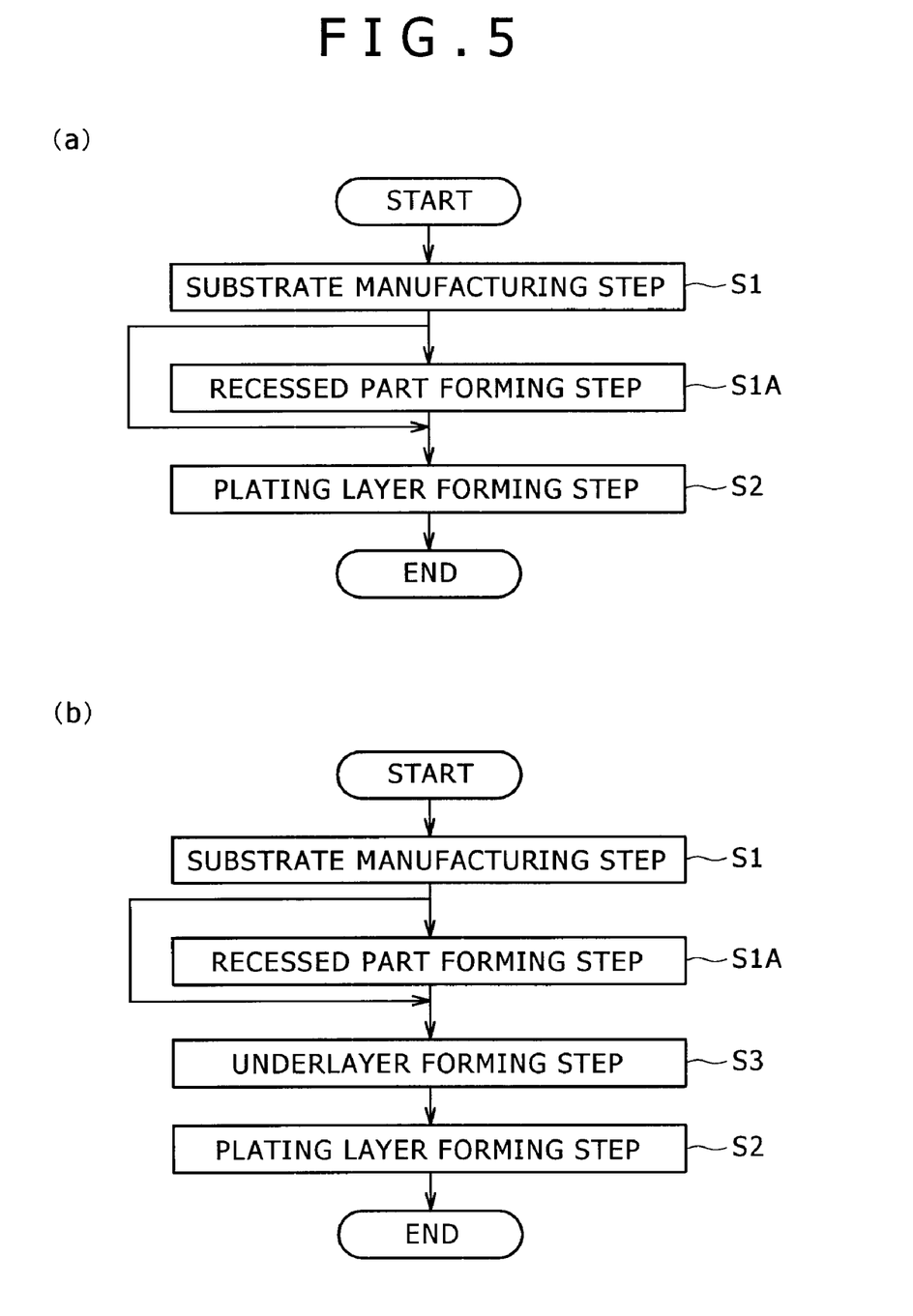

As shown in FIG. 5 (a), the manufacturing method of a separator for a fuel cell comprises a substrate manufacturing step S1 and a plating layer forming step S2. Also, a recessed part forming step S1A may be included after the substrate manufacturing step S1. Each step will be described below. The construction of the separator will be described referring to FIG. 1 (a).

(Substrate Manufacturing Step: S1)

The substrate manufacturing step S1 is a step for manufacturing the substrate 2 composed of pure aluminum or aluminum alloy (hereinafter referred to as "aluminum alloy") with a designated thickness (0.05-0.5 mm, for example). A method publicly known conventionally is used for manufacturing the substrate 2. For example, an aluminum alloy is melted and casted, an ingot is hot rolled, cold rolling, annealing and the like are performed according to the necessity, and an aluminum alloy sheet is manufactured. Further, this aluminum alloy sheet is sheared to a designated size (20 mm×50 mm, for example) to manufacture the substrate 2.

(Recessed Part Forming Step: S1A)

The recessed part forming step S1A is a step for forming, according to the necessity, the recessed part 11 (refer to FIG. 2) which becomes a flowing passage for flowing gas such as hydrogen and air in actuation of the fuel cell 20 on the surface of the substrate 2 manufactured by the step described above. A mechanical machining method, a pressing method and the like are used for forming the recessed part 11.

(Plating Layer Forming Step: S2)

The plating layer forming step S2 is a step for forming the plating layer 3 including a double layer of the copper layer 3a and the tin layer 3b on the surface of the substrate 2 (inclusive of the substrate formed with the recessed part 11 on the surface) manufactured by the step described above. Also, in the plating layer 3, the copper layer 3a is formed in the substrate 2 side, and the tin layer 3b is formed on the copper layer 3a. A wet plating method is used for forming the plating layer 3. By using the wet plating method, when the gas flow passage (the recessed part 11) is formed on the surface of the substrate 2, the plating layer 3 can be formed with a generally uniform thickness to the uneven shape of the flow passage. Also, because the plating layer 3 is formed also in a part where the end face of the substrate 2 is exposed such as a gas flowing-in port and a gas flowing-out port (not shown) formed in the substrate 2, the part where the substrate itself is exposed can be eliminated almost at all. Although the wet plating method may be either an electrolytic plating method or an electroless plating method, the electrolytic plating method is preferable if the denseness of the plating layer 3 and the productivity are taken into consideration. Also, the processing time for plating is controlled so that the thickness of the copper layer 3a becomes 0.10 μM or above and a value obtained by dividing the thickness of the tin layer 3b by the thickness of the copper layer 3a becomes 0.1-50.

Also, in the plating layer forming step S2, the diffusion layer 3c where the copper is diffused into the tin layer 3b is formed in the boundary face of the copper layer 3a and the tin layer 3b by forming the tin layer 3b on the copper layer 3a. Also, it is desirable to perform a heating treatment at a temperature of 80° C. or above and the melting point of tin or below after the plating layer forming step S2. By this heating treatment, the diffusion layer 3c grows, and the adhesiveness of the copper layer 3a and the tin layer 3b is improved further. Also, the time of the heating treatment may be adjusted appropriately according to the treatment temperature. On the other hand, if the heating treatment is performed for a short time at a temperature of the melting point of tin or above and the tin layer 3b is once melted and is thereafter cooled rapidly, there is an effect of further reducing the pinholes of the tin layer 3b. For example, if the heat treatment for 5 seconds at 300° C. and rapid cooling are performed, the effect can be obtained; however, at that time, it is preferable to spray an anti-tarnish agent for inhibiting discoloration of the tin layer 3b beforehand.

Further, with regard to formation of the tin layer 3b, the tin single layer composed of tin only and not containing carbon may be formed after forming the copper layer 3a on the substrate 2, or the tin and carbon mixture layer composed of tin and carbon may be formed after forming the copper layer 3a, or otherwise the tin and carbon mixture layer may be formed after the tin single layer is formed after forming the copper layer 3a. By formation of the tin and carbon mixture layer, at least the surface of the tin layer 3b comes to contain carbon.

In order to form the tin and carbon mixture layer, it is desirable to perform electrolytic plating in a tin plating bath where the particles and fine fibers of carbon are uniformly dispersed. However, even if electroplating is simply performed dispersing the particles and fine fibers of carbon in the tin plating bath, the particles and fine fibers of carbon are hardly taken into the tin layer 3b. In order to take the particles and fine fibers of carbon into the tin layer 3b efficiently, it is effective to add a cationic surfactant and the like for charging the particles and fine fibers of carbon positively in the tin plating bath. Because the material to be plated becomes a negative electrode in plating treatment, if the particles and fine fibers of carbon are charged positively, they are easily brought electrically to the side of the material to be plated during the plating treatment and come to be easily taken into the tin layer 3b. With regard to the cationic surfactant, hexamethyltrimethylammonium chloride, hexamethylammonium bromide, alkyltrimethylammonium chloride and the like are used appropriately.

Furthermore, in order to attain Sn(at %)/C(at %): 0.01-2, it is desirable to adjust the content of the particles and fine fibers of carbon (carbon content) dispersed into the tin plating bath to a designated range which is 1-200 g/l. When the carbon content in the tin plating bath is below 1 g/l, the value Sn (at %)/C(at %) exceeds 2, the quantity of carbon acting as an electrically conductive path decreases, and the effect of inhibiting increase of the contact resistance of the surface of the separator 1, 1A in the high temperature and acid atmosphere cannot be obtained. When the carbon content in the tin plating bath exceeds 200 g/l, the viscosity of the tin plating solution becomes high, and a uniform plating layer cannot be formed. Also, Sn(at %)/C(at %) becomes less than 0.01, the uppermost layer comes to be covered with generally carbon only, and the tin layer 3b becomes a weak layer such that it exfoliates easily when touched by a finger. Preferable range of the carbon content in the tin plating solution is 3-180 g/l, more preferably 5-150 g/l.

The manufacturing method of a separator for a fuel cell in relation with the present invention may include the substrate manufacturing step S1, the underlayer forming step S3, the plating layer forming step S2, and, according to the necessity, the recessed part forming step S1A. Because the substrate manufacturing step S1, the plating layer forming step S2 and the recessed part forming step S1A are similar to the above description, explanation will be omitted. Also, in the plating layer forming step S2, the plating layer 3 is formed on the underlayer 4 (refer to FIG. 1 (b)) formed in the underlayer forming step S3, not on the substrate 2.

(Underlayer Forming Step: S3)

The underlayer forming step S3 is a step for forming the underlayer 4 composed of a metal selected from nickel, chromium, iron, cobalt, or an alloy thereof (for example, Ni—P, Ni—B, and the like) on the substrate 2 (inclusive of the substrate formed with the recessed part 11 on the surface) manufactured in the substrate manufacturing step S1. Similar to the plating layer forming step S2, a wet plating method is used for forming the underlayer 4. By using the wet plating method, the underlayer 4 can be formed with a generally uniform thickness on the surface of the substrate 2 (to the uneven shape of the recessed part 11). In addition, because the underlayer 4 is formed also in a part where the end face of the substrate 2 is exposed, the part where the substrate itself is exposed can be eliminated almost at all. Although the wet plating method may be either method of an electrolytic plating method or an electroless plating method, the electrolytic plating method is preferable if the denseness of the underlayer 4 and the productivity are taker into consideration.

Although the manufacturing method of the present invention is as described above, in performing the present invention, other step (s) may be included between, before or after the respective steps described above in the scope not affecting adversely to the respective steps described above. For example, a cleaning step for decreasingly cleaning the surface of the substrate 2, a desmutting treatment step for performing a desmutting treatment, and a zincate treatment step for performing a zincate treatment may be performed after the substrate manufacturing step S1 (recessed part forming step S1A).

EXAMPLE 1

An example in which the effect of the present invention has been confirmed will be described.

A pure aluminum (1050 alloy) sheet for industrial use and 4 kinds of aluminum alloy (3003, 5052, 5182, 6061 alloy) sheets with 0.5 mm sheet thickness were sheared to a 20 mm×50 mm size, and were decreasingly cleaned in acetone. Then, they were immersed in a 10 mass % sodium hydroxide aqueous solution of 50° C. for one minute, were desmutted by immersing in a 20 mass % nitric acid aqueous solution of a room temperature for 2 minutes after water washing, and were thereafter water washed. Then, they were performed with a zincate treatment for the sheet surface using a zincate treatment solution on the market, were performed thereafter with the plating treatment of underlayer, copper, and tin respectively, and the test sheets were manufactured.

The plating treatment of each of the underlayer, copper and tin was performed using the plating bath on the market under the conditions described below with respect to the temperature and current density of the treatment. Also, the plating thickness was controlled by controlling the treatment time. The layer construction and the plating thickness of the test sheets of each kind manufactured are shown in Table 1.

{Plating Treatment Conditions}
(Underlayer Plating)
(Nickel Plating) Temperature: 60° C., current density: 0.1 A/cm$^2$
(Chromium Plating) Temperature: 50° C., current density: 0.3 A/cm$^2$
(Iron Plating) Temperature: 60° C., current density: 0.05 A/cm$^2$
(Cobalt Plating) Temperature: Room temperature, current density: 0.1 A/cm$^2$
(Copper Plating) Temperature: 50° C., current density: 0.05 A/cm$^2$
(Tin Plating) Temperature: 40° C., current density: 0.15 A/cm$^2$ First, the adhesiveness of the plating layer was visually confirmed with respect to the test sheets of each kind, and the result is shown in Table 1. In Table 1, one in which the substrate and the plating layer are entirely exfoliated was marked "x", one with partial exfoliation was marked "Δ", and one without exfoliation was marked "o".

Next the contact resistance value of the test sheets of each kind manufactured was measured. Measurement of the contact resistance value was performed by measuring the contact resistance value under the load of 98 N (10 kgf) using a contact resistance measuring device 30 shown in FIG. 3. As shown in FIG. 3, both sides of the test sheet 1 were embraced by carbon clothes C, their outer sides were pressed with 98 N using copper electrodes with 1 cm$^2$ contact area, 7.4 mA current was applied using a DC power source 32, the voltage applied between the carbon clothes C was measured by a voltmeter 33, and the contact resistance value was calculated. Then, after each test sheet was immersed in an 80° C. sulfuric acid aqueous solution (pH 3) for 500 hours respectively, the contact resistance value was calculated again in the similar method as described above. Also, after the immersion in the sulfuric acid aqueous solution, the elution quantity of the aluminum ions into the solution was measured by an ICP (Inductivity Coupled Plasma) emission mass spectrometry. The result is shown in Table 1.

Based on the contact resistance value (the initial contact resistance value and the contact resistance value after immersion in the sulfuric acid aqueous solution) and the elution quantity of the aluminum ions measured (calculated), the electrical conductivity and the corrosion resistance were evaluated as described below.

(Electrical Conductivity)

One with both the initial contact resistance value and the contact resistance value after immersion in the sulfuric acid aqueous solution being 5 mΩ·cm$^2$ or below was deemed passed.

(Corrosion Resistance)

One with the contact resistance value after immersion in the sulfuric acid aqueous solution being 5 mΩ·cm$^2$ or below and the elution quantity of the aluminum ions being 10 μg/cm$^2$ or below was deemed passed.

From the result of Table 1, it was confirmed that the examples satisfying the claims of the patent (Nos. 1-17) showed excellence in the electrical conductivity and the corrosion resistance because both the initial contact resistance value and the contact resistance value after immersion in the sulfuric acid aqueous solution were 5 mΩ·cm$^2$ or below and the elution quantity of the aluminum ions was 10 μg/cm$^2$ or below. Further, when any of the alloys was used for the substrate, excellence in the electrical conductivity and the corrosion resistance was also confirmed similarly.

On the other hand, in the comparative examples not satisfying the claims of the patent (Nos. 18-24), the contact resistance value increased by immersion in the sulfuric acid aqueous solution and exceeded 5 mΩ·cm$^2$. Also, the elution quantity of the aluminum ions from the substrate exceeded 10 μg/cm$^2$. Further, in these test sheets, extreme discoloration and a corrosion product were visually confirmed. Accordingly, it was confirmed that the comparative examples (Nos. 18-24) were inferior in the electrical conductivity and the corrosion resistance.

Figure 4:
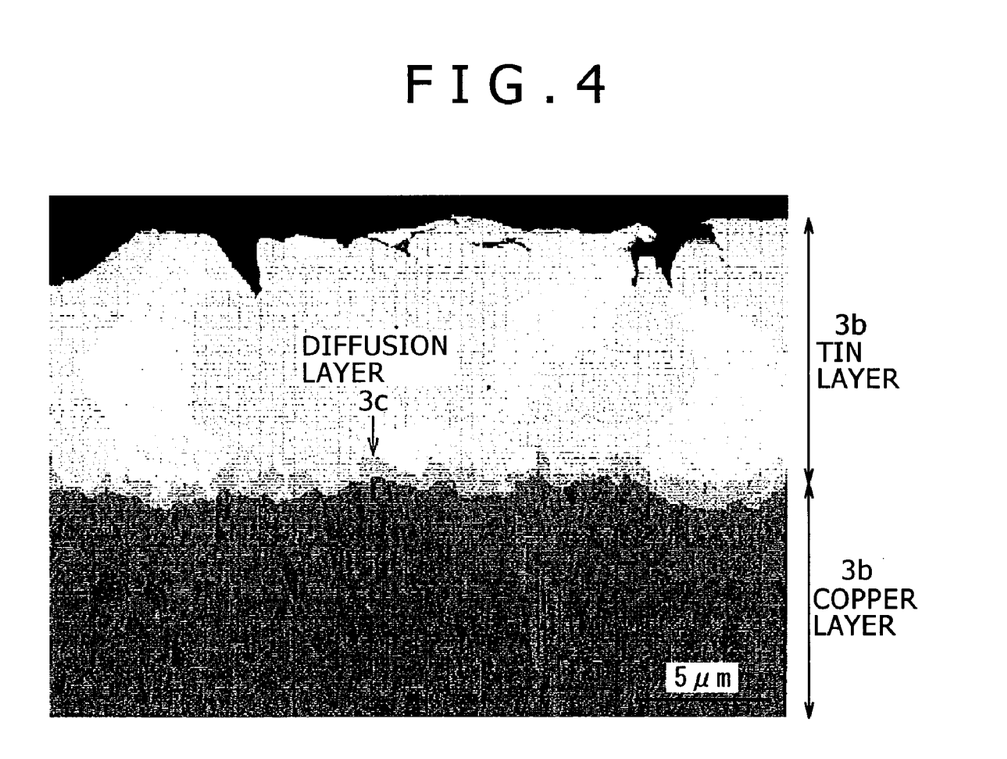
[FIG. 4] A photograph taken by a scanning electron microscope showing the construction of a plating layer of a separator for a fuel cell in relation with the present invention.

Next, the cross-sectional construction of the test sheet of the example (No. 2) which was excellent in the electrical conductivity and the corrosion resistance was observed. The method of the observation of the cross section was conducted by performing cross section machining first by a cross section polishing device (SM-09010 made by JEOL), and observing the cross section by a field emission type scanning electron microscope (FE-SEM). The observed image of the cross section is shown in FIG. 4. As shown in FIG. 4, an area with the different contrast was observed in the boundary face between the tin layer and the copper layer, and it was known that copper and tin coexisted when the composition analysis was performed for the area by an energy dispersion type X-ray analyzer. Consequently, it was confirmed that the area was the diffused layer and the diffusion layer was formed in the continuous islands shape along the boundary face.

TABLE 1

| | No. | Substrate | Layer construction | Thickness of plating layer (μm) Underlayer | Cu layer | Sn layer | Sn/Cu | Adhesiveness of plating layer | Initial contact resistance value (mΩ·cm$^2$) | Contact resistance value after immersion in sulfuric acid aqueous solution (mΩ·cm$^2$) | Elution quantity of Al (μg/cm$^2$) |
|---|---|---|---|---|---|---|---|---|---|---|---|
| Example | 1 | Pure Al | Sn/Cu/Ni/substrate | 10 | 10 | 5 | 0.5 | ○ | 1.2 | 2.9 | 0 |
| | 2 | 5182 | Sn/Cu/Ni/substrate | 10 | 10 | 10 | 1.0 | ○ | 1.1 | 3.4 | 0 |
| | 3 | Pure Al | Sn/Cu/Ni/substrate | 1.5 | 5 | 5 | 1.0 | ○ | 2.5 | 3.9 | 7.6 |
| | 4 | 5182 | Sn/Cu/Ni/substrate | 5 | 2 | 10 | 5.0 | ○ | 1.5 | 4.3 | 4.1 |
| | 5 | 5182 | Sn/Cu/Ni/substrate | 10 | 2 | 20 | 10.0 | ○ | 1.6 | 3.5 | 0.7 |
| | 6 | 5182 | Sn/Cu/Ni/substrate | 10 | 2 | 40 | 20.0 | ○ | 1.3 | 3.2 | 0.3 |
| | 7 | 5182 | Sn/Cu/Ni/substrate | 10 | 10 | 2 | 0.2 | ○ | 1.9 | 4.4 | 5.5 |
| | 8 | 5182 | Sn/Cu/Ni/substrate | 1.5 | 10 | 5 | 0.5 | ○ | 1.5 | 4.8 | 6.5 |
| | 9 | Pure Al | Sn/Cu/Ni/substrate | 5 | 10 | 2 | 0.2 | ○ | 2.0 | 3.9 | 3.7 |
| | 10 | 5182 | Sn/Cu/substrate | — | 5 | 5 | 1.0 | ○ | 1.8 | 4.6 | 7.7 |
| | 11 | 5182 | Sn/Cu/Cr/substrate | 10 | 10 | 10 | 1.0 | ○ | 1.5 | 3.2 | 0 |
| | 12 | 5182 | Sn/Cu/Fe/substrate | 10 | 10 | 10 | 1.0 | ○ | 1.8 | 3.8 | 0 |
| | 13 | 5182 | Sn/Cu/Co/substrate | 10 | 10 | 10 | 1.0 | ○ | 1.7 | 3.5 | 0 |
| | 14 | 3003 | Sn/Cu/Ni/substrate | 5 | 5 | 5 | 1.0 | ○ | 1.4 | 3.9 | 4.0 |
| | 15 | 5052 | Sn/Cu/Ni/substrate | 5 | 5 | 5 | 1.0 | ○ | 1.3 | 4.1 | 3.8 |
| | 16 | 6061 | Sn/Cu/Ni/substrate | 5 | 5 | 5 | 1.0 | ○ | 1.5 | 4.2 | 4.2 |
| | 17 | 3003 | Sn/Cu/Ni/substrate | 2 | 0.15 | 2 | 13.3 | ○ | 1.8 | 3.8 | 5.0 |
| Comparative example | 18 | 5185 | Sn/Cu/Ni/substrate | 5 | 10 | 0.5 | 0.05 | ○ | 2.5 | 25.5 | 16.8 |
| | 19 | 5182 | Sn/Ni/substrate | 5 | — | 10 | — | Δ | 1.2 | 5.8 | 15.8 |
| | 20 | Pure Al | Sn/substrate | — | — | 5 | — | × | 1.2 | 8.0 | 19.5 |
| | 21 | 5182 | Cu/Sn/Ni/substrate | 5 | 5 | 5 | 1.0 | ○ | 7.3 | 59.1 | 28.5 |
| | 22 | 5182 | Cu/Sn/substrate | — | 5 | 5 | 1.0 | × | 7.8 | 62.5 | 55.0 |
| | 23 | 5182 | Cu/Ni/substrate | 5 | 10 | — | — | ○ | 8.1 | 58.0 | 65.5 |
| | 24 | 5182 | Sn/Cu/Ni/substrate | 5 | 0.08 | 5 | 62.5 | Δ | 1.9 | 11.7 | 15.3 |

EXAMPLE 2

By a method similar to Example 1, the test sheets in which the tin and carbon mixture layer (Sn+C) comprising the particles of carbon was formed in the tin plating bath dispersed with the particles of carbon after the underlayer and the copper layer were formed on the aluminum alloy (5182 alloy) sheets were manufactured. Further, by a method similar to Example 1, the test sheets in which the tin and carbon mixture layer (Sn+C) comprising the particles of carbon was formed in the tin plating bath dispersed with the particles of carbon after the underlayer, the copper layer and the tin single layer (Sn) composed of tin only were formed on the aluminum alloy (5182 alloy) sheets were also manufactured.

The tin and carbon mixture layer was formed by using the carbon particles with 5 μm average grain size, dispersing the carbon particles by 50 g/l density in the tin plating bath where hexamethyltrimethylammonium chloride was added in an amount of 10 g/l as a cationic surfactant, and performing a plating treatment at 40° C. bath temperature with 0.15 A/cm² current density.

Also, the plating treatment was performed under a condition similar to the above adding sodium lauryl sulfate in an amount of 10 g/l as an anionic surfactant and dispersing the carbon particles in the tin plating bath by 50 g/l density when the carbon particles were to be dispersed in the tin plating bath.

After the carbon particles of the test sheets manufactured simply sticking on the surface were removed by ultrasonic cleaning, the composition analysis and contact resistance measurement of the surface were performed similarly to Example 1.

The composition analysis of the surface was performed from the uppermost layer side of the test sheets by a scanning electron microscope/an energy dispersion type analyzer (SEM/EDX) under a condition of 15 kV acceleration voltage, the quantitative analysis (atom %) was performed with respect to tin and carbon, and the ratio of atom % of tin and carbon (Sn(at %)/C(at %)) was calculated thereafter. The layer construction, plating thickness, ratio of atom % of tin and carbon (Sn(at %)/C(at %)), the initial contact resistance value, and the contact resistance value after immersion in the sulfuric acid aqueous solution of the test sheets manufactured were shown in Table 2.

From the result of Table 2, it is known that, in the examples where the tin and carbon mixture layer in which the carbon particles were dispersed was formed on the copper layer (Nos. 25-30), the contact resistance value after immersion in the sulfuric acid aqueous solution tends to be lower compared with that in examples where only the tin single layer was formed (Nos. 1-17, refer to Table 1) and increase of the contact resistance value in the high temperature and acid atmosphere is inhibited.

On the other hand, in the example No. 31 which was manufactured using an anionic surfactant in dispersing the carbon particles, carbon was not taken into the tin layer much and the ratio of atom % of tin and carbon (Sn(at %)/C(at %)) was over 2, therefore the contact resistance value after immersion in the sulfuric acid aqueous solution was a value equivalent to that in the examples of Table 1 where the tin single layer was formed (Nos. 1-17, refer to Table 1).

| | Description of the Numerals |
|---|---|
| 1, 1A: | Separator for a fuel cell |
| 2: | Substrate |
| 3: | Plating layer |
| 3a: | Copper layer |
| 3b: | Tin layer |
| 3c: | Diffusion layer |
| 4: | Underlayer |
| S1: | Substrate manufacturing step |
| S1A: | Recessed part forming step |
| S2: | Plating layer forming step |
| S3: | Underlayer forming step |

The invention claimed is:

1. A separator, comprising:
   a substrate consisting of pure aluminum or aluminum alloy and
   a plating layer formed on the substrate
   wherein the plating layer comprises a copper layer on a substrate side and a tin layer on the copper layer,
   the tin layer comprises a tin and carbon mixture layer,
   the tin and carbon mixture layer is an uppermost layer consisting of tin and carbon,
   a ratio of a tin content to a carbon content by atomic % in the tin and carbon mixture layer is from 0.01 to 2, as measured in a composition analysis from an uppermost

TABLE 2

| | No. | Substrate | Layer construction | Thickness of plating layer (μm) | | | | | Sn (at %)/ C (at %) | Initial contact resistance value (mΩ·cm²) | Contact resistance value after immersion in sulfuric acid aqueous solution (mΩ·cm²) |
|---|---|---|---|---|---|---|---|---|---|---|---|
| | | | | Underlayer | Cu layer | Sn | Sn + C | Sn/Cu | | | |
| Example | 25 | 5182 | Sn + C/Cu/Ni/substrate | 10 | 10 | — | 10 | 1.0 | 0.9 | 1.1 | 2.3 |
| | 26 | 5182 | Sn + C/Cu/Ni/substrate | 5 | 5 | — | 5 | 1.0 | 1.8 | 1.8 | 3.0 |
| | 27 | 5182 | Sn + C/Cu/Cr/substrate | 5 | 5 | — | 5 | 1.0 | 0.5 | 1.3 | 2.3 |
| | 28 | 5182 | Sn + C/Sn/Cu/Ni/substrate | 10 | 10 | 5 | 5 | 1.0 | 1.1 | 1.9 | 2.6 |
| | 29 | 5182 | Sn + C/Sn/Cu/Ni/substrate | 5 | 5 | 3 | 5 | 1.6 | 0.3 | 1.2 | 2.3 |
| | 30 | 5182 | Sn + C/Sn/Cu/Co/substrate | 5 | 5 | 3 | 5 | 1.6 | 0.3 | 1.2 | 2.5 |
| | 31 | 5182 | Sn + C/Sn/Cu/Ni/substrate | 10 | 10 | 5 | 5 | 1.0 | 4.6 | 1.9 | 3.6 |

(Note)
Surfactant: (Nos. 25-30) Cation-based, (No. 31) Anion-based layer side by a scanning electron microscope or an energy dispersion type analyzer under 15 kV acceleration voltage, a thickness of the copper layer is 0.10 μm or above, a quotient of a thickness of the tin layer divided by the thickness of the copper layer is from 0.1 to 50, and wherein the separator is suitable for a fuel cell.

2. The separator of claim 1, further comprising:

an underlayer between the substrate and the plating layer, wherein the underlayer consists of nickel, chromium, iron, cobalt, or any alloy thereof.

3. The separator of claim 2 wherein a thickness of the underlayer is 0.5 μm or above.

4. A method of manufacturing the separator of claim 2, the method comprising:

manufacturing a substrate, forming the underlayer on the substrate by wet plating, and forming the plating layer on the underlayer by wet plating.

5. The separator of claim 1, wherein the tin layer consists of the tin and carbon mixture layer.

6. The separator for a fuel cell according to claim 1, wherein the tin layer further comprises a tin single layer consisting of tin, and the tin and carbon mixture layer is on the tin single layer.

7. The separator of claim 6, wherein the tin layer consists of the tin and carbon mixture layer and the tin single layer.

8. A method of manufacturing the separator of claim 1, the method comprising:

manufacturing the substrate, and forming the plating layer on the substrate by wet plating.

9. The method of claim 8, wherein forming the plating layer on the substrate comprises forming the tin and carbon mixture layer by a plating treatment comprising:

adding carbon and a cationic surfactant into a tin plating bath and adjusting a carbon content in the tin plating bath to from 1 to 200 g/L.

10. The method of claim 9, wherein the tin layer further comprises a tin single layer consisting of tin, and forming the tin and carbon mixture layer is on the tin single layer.

* * * * *